United States Patent [19]

Dischert et al.

[11] Patent Number: 4,684,977
[45] Date of Patent: Aug. 4, 1987

[54] LUMINANCE/CHROMINANCE SEPARATION CIRCUITRY

[75] Inventors: Robert A. Dischert, Burlington, N.J.; Joseph R. Ader, Yardley; Robert J. Topper, Philadelphia, both of Pa.

[73] Assignee: RCA Corporation, Princeton, N.J.

[21] Appl. No.: 759,832

[22] Filed: Jul. 29, 1985

[51] Int. Cl.⁴ .............................................. H04N 9/78
[52] U.S. Cl. ......................................... 358/31; 358/37
[58] Field of Search .................. 358/31, 36, 37, 21 R, 358/38

[56] References Cited

U.S. PATENT DOCUMENTS

| | | | |
|---|---|---|---|
| 4,107,736 | 8/1978 | Lowry et al. | 358/36 |
| 4,498,100 | 2/1985 | Bunting et al. | 358/31 |
| 4,551,753 | 11/1985 | Nishizawa et al. | 358/140 |
| 4,598,309 | 7/1986 | Casey | 358/31 X |
| 4,626,895 | 12/1986 | Reitmeier | 358/31 |

FOREIGN PATENT DOCUMENTS 58-212282  12/1983  Japan.

OTHER PUBLICATIONS

J. O. Drewery, "The Filtering of Luminance and Chrominance Signals to Avoid Cross-Colour in a PAL Colour System", BBC Eng., 9/76, pp. 8–39.
SN 741,591, Filed 6/5/85 "Video Signal Processing Apparatus", by C. H. Strolle et al.
SN. 615,544, Filed 5/31/84, "Field Comb for Luminance Separation of NTSC Signals", W. A. Moles et al.

Primary Examiner—James J. Groody
Assistant Examiner—Victor R. Kostah
Attorney, Agent, or Firm—E. M. Whitacre; P. J. Rasmussen; E. P. Herrmann

[57] ABSTRACT

A frame comb type composite video decoder which does not require motion adaptive processing circuitry generates low frequency luminance signal components from one field of composite video signal. The high frequency luminance component is derived from two lines of composite video signal from each of two fields disposed before and after the field from which the low frequency luminance signals is developed.

8 Claims, 2 Drawing Figures

LUMINANCE/CHROMINANCE SEPARATION CIRCUITRY

This invention relates to decoding circuitry for separating luminance and chrominance component signals from composite video signal.

BACKGROUND OF THE INVENTION

In order to utilize the full bandwidth of the luminance component of composite video signals special circuitry is required to separate it from the chrominance component which shares the high frequency band of the composite signal. Conventional circuitry used to perform this function is in the form of transversal filters, the most common of which is the interline comb filter which obtains the sums and differences of the composite signals delayed, with respect to each other, by one or two integral horizontal line intervals. Interline comb filters perform relatively satisfactorily even when the video signal contains image motion. Interline comb filters, however, produce a particularly objectionable artifact known as "hanging dots". Hanging dots are observed as a line of bright and dark spots reproduced along horizontal edges that undergo a color transition and are caused by incomplete cancellation of chrominance in the luminance signal.

A second type of wideband luminance/chrominance decoder is the frame comb filter which obtains the sums and differences of composite video signals delayed relative to each other by integral frame intervals. Frame comb filters do not exhibit any of the undesirable artifacts produced by interline comb filters if the images represented by the video signal contain no image motion. However, when images do include motion, the frame comb filters generate phantom images and relatively large areas of color dots along moving edges. Numerous methods have been proposed which eliminate motion induced artifacts, all of which require circuitry to detect the occurrence of motion. In general, it is difficult to distinguish between signal noise and image motion, thus, the performance of motion adaptive frame comb filters is only slightly better than that of interline comb filters and at the expense of significantly more circuit hardware.

Finally, a third type of transversal filter for decoding the luminance and chrominance component from composite video takes the form of, e.g. output weighted finite impulse response filters. These filters require a large number of frame delays, for example seven, and though they do not require motion adaptive circuitry, are prohibitively expensive for use in consumer TV receivers.

An object of the present invention is to provide a luminance/chrominance decoding apparatus which exhibits superior performance, does not require motion adaptive circuitry, and is relatively cost effective.

SUMMARY OF THE INVENTION

The present invention includes a decoder for separating one or both of the luminance and chrominance components from composite video signal. The decoder includes delay means for simultaneously providing first, second, third and fourth composite video signals wherein the second, third and fourth signals are respectively delayed relative to the first by one, five hundred twenty five and five hundred twenty six horizontal line intervals. Signal combining means, combines the first, second, third and fourth signals to provide at least a portion of one of the separated luminance and chrominance signals.

DETAILED DESCRIPTION

Figure 1:
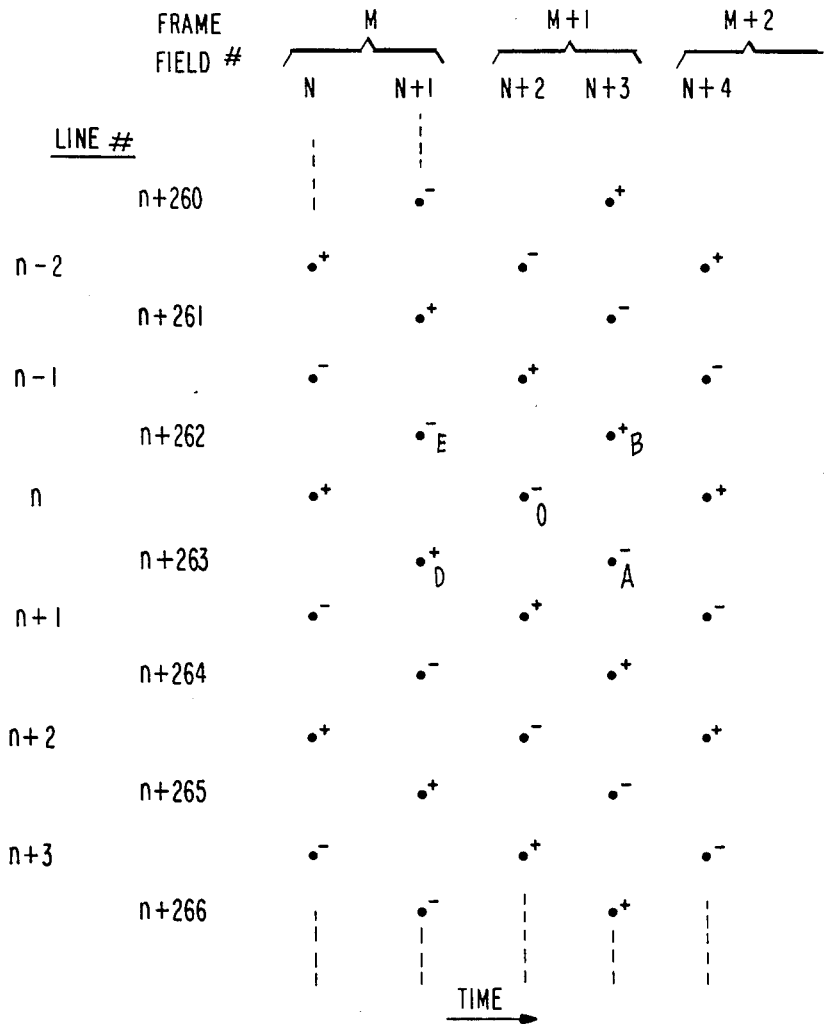
FIG. 1 is a pictorial spatio-temporal representation of a portion of composite video signals for portions of several video signal field intervals.

Referring to FIG. 1, the vertical columns of dots represent portions of successive fields of video signal. The dots represent horizontal lines of video signal (looking end on with the lines going into the paper). The offset in dot positions between adjacent fields illustrates the interlaced scanning offset as displayed in the reproduced image. The + and − signs adjacent each dot indicate the relative phase of the chrominance subcarrier line-to-line and field-to-field.

Assume that the current signal output by the decoder of the present invention corresponds to horizontal line 0. The low frequency portion of the decoded luminance signal is derived by low-pass filtering composite video signal from line 0. The high frequency portion of the luminance signal is derived by additively combining equal portions of signal from lines A, B, D and E. The combined signal is high-pass filtered and added to the low frequency contribution from line 0. The spatial average of these signals falls on point 0, and thus, is consistent with combining it with the low frequency contribution from line 0.

The composite video signal from lines A and E have a complementary chrominance phase relationship with respect to the signals from lines B and D. Thus, when the additively combined signal from lines A and B are further additively combined with the combined signal from lines D and E, the chrominance components cancel, leaving only the luminance component. No hanging dots result for the following reason. Adding signal from lines A and B or lines D and E is tantamount to performing interline comb filtering. As such, either combination will produce hanging dots under appropriate signal conditions. However, the hanging dots attendant the combination of signals from lines A and B will be antiphase with hanging dots attendant the combined signal from lines D and E and the combination of both tends to cancel the hanging dots.

The more objectionable motion-induced artifacts produced by frame comb filters occur in the lower band of frequencies of the frame filtered signal. In the present invention, the low frequency luminance signal, being derived from a single signal, i.e. line 0, and i.e. not being the combination of signal from adjacent frames, exhibits no low frequency motion-induced artifacts in the reproduced image.

Color dots trailing a moving edge do not occur for reasons similar to the cancellation of hanging dots. Color dots arise due to imperfect cancellation of the luminance component in the chrominance signal. The chrominance signal is generated by adding the complements of signal from lines B and D to signal from lines A and E. Complementing signal from lines B and D inverts the phase of the chrominance signal therein to be in phase with the chrominance signal from lines A and E. The chrominance components from all four lines add constructively. The inverted luminance signal from lines B and D cancel the non-inverted luminance signal from lines A and E. The chrominance signal, $C_0$, is given by the equation $$C_0 = (C_A - C_B - C_D + C_E)/4 \qquad (1)$$

wherein $C_A$, $C_B$, $C_D$ and $C_E$ represent the chrominance signal components from lines A, B, D and E respectively.

If the signal is redundant between successive lines in a frame and between like pixels in successive frames, the chrominance signal $C_0$ is just equal to the input chrominance signal C. If there is motion between frames, the bandwidth of the chrominance signal will be reduced at the moving edges, but this does not significantly adversely affect reproduced image quality because in general, the eye cannot discern rapidly moving edges anyway.

Next, consider the luminance component which contaminates the chrominance output due to dots trailing a moving edge. The luminance component, $L_{OC}$, in the chrominance output is given by the equation $$L_{OC} = (L_A - L_D + L_E 31 \ L_B)/4 \qquad (2)$$

wherein $L_A$, $L_D$, $L_E$ and $L_B$ represent the luminance signal components in lines A, D, E and B respectively. If the signal is redundant from line-to-line, which holds true for the majority of images, and the signal is the same for corresponding pixels in successive frames, then the value $L_{OC}$ is zero.

Next consider that horizontal image motion occurs between frames M and M+1. The differences $(L_A - L_D)$ and $(L_E - L_B)$ in equation (2) will in general be equal but of opposite polarity and so will cancel. Finally, considering vertical motion, the terms in equation (2) may be rearranged to form the sum of the differences $L_A - L_B$) and $(L_E - L_D)$, which difference will be equal for vertical motion but of opposite polarity, and so also cancel. Thus, trailing color dots are not produced following moving edges in the image.

Figure 2:
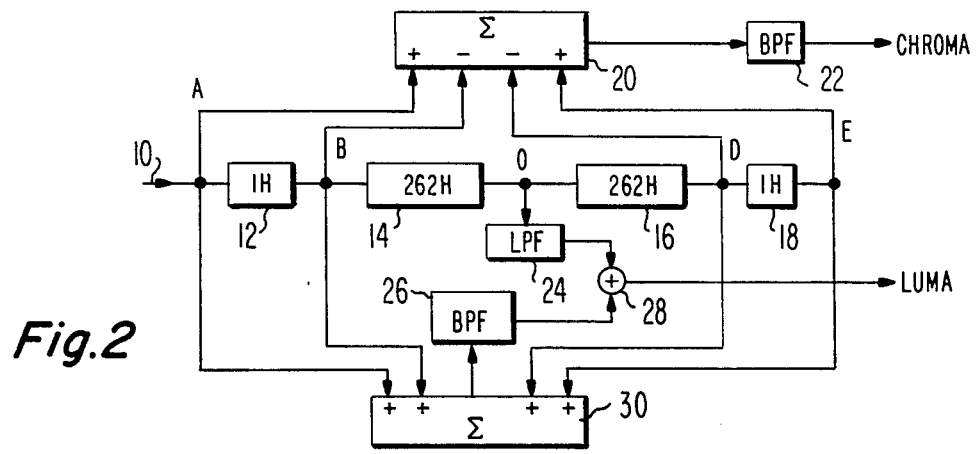
FIG. 2 is a block diagram of a luminance/chrominance decoder embodying the present invention.

FIG. 2 illustrates circuitry according to the invention for performing the aforedescribed composite video signal decoding algorithm. In FIG. 2, composite video signal is applied to terminal 10. The composite video signal at terminal 10 is coupled to cascade-connected delay elements 12, 14, 16 and 18 which respectively provide at their output terminals signal delays of one, two hundred sixty three, five hundred twenty five and five hundred twenty six horizontal line intervals relative to the signal at terminal 10. Signal at the input to delay element 12 and delayed signals from the outputs of delay elements 12, 14, 16 and 18 correspond to signals from lines A, B, O, D and E respectively in FIG. 1.

Composite video signal from terminal 10 and delayed composite video signal from the respective output terminals of delay elements 12, 16 and 18 are coupled to signal combiner 30 which additively combines the four signals to produce a luminance signal which is applied to filter 26. Filter 26 may be a high-pass filter, band-pass filter or a sampled data filter with a general cosinusoidal transfer function. Filter 26 attenuates signal in the frequency band of composite video signal which is not normally occupied by the chrominance component. The signal output by filter 26 is a high frequency luminance signal, which signal is coupled to one input of adder 28.

Delayed composite video signal from delay element 14 is coupled to the filter 24. Filter 24 may be a low-pass filter or a sampled data filter with a general cosinusoidal transfer function. Filter 24 attenuates signal in the frequency band of composite video signal normally occupied by the chrominance component. In general, filters 24 and 26 have complementary transfer functions in the band of frequencies occupied by composite video signal.

The signal provided from filter 24 is low frequency luminance signal and is coupled to a second input of adder 28. Adder 28 produces a wideband luminance signal.

Nominally, the four signals which are combined in element 30 are weighted by a factor of ¼ before being applied to signal combiner 30 so that combiner 30 produces a normalized signal. Alternatively, the output signal from signal combiner 30, or the output signal from filter 26, may be weighted by ¼ to normalize the signal. Note, however, that high frequency luminance peaking may be achieved by weighting the signal from filter 26 by a larger factor, e.g. ½.

Composite video signal from input terminal 10 and delayed composite video signal from the outputs of delay elements 12, 16 and 18 are coupled to signal combiner 20. Signal combiner 20 additively combines signal from input terminal 10 and delay element 18 with the inverse polarity signal from delay elements 12 and 16 to produce a chrominance signal including low frequency motion-induced luminance contamination. The signal produced by signal combiner 20 is coupled to the filter 22 which attenuates signals outside the band of frequencies normally occupied by chrominance signals to produce a generally contamination-free chrominance signal.

If the composite video signal is a sampled signal occurring at four times the color subcarrier frequency, and if the samples are formed by a sampling clock phase locked to the color subcarrier and aligned with the phases of the color difference signals modulating the subcarrier, then the sequences of samples represent interleaved color difference signal samples. Under these circumstances, signal combiner 20 may be utilized to demodulate the chrominance signal by, for example, outputting two of each sequence of four sums. The two sums from each set of four sums may be demultiplexed to separate signal paths corresponding to first and second color difference signals, each of which is applied to a filter. The filters in this case will in general have a low-pass transfer function commensurate with the bandwidth of the color difference signal.

Alternatively, demodulation may be performed by the filter 22 performing a decimation of two of every four samples passed therethrough.

The structure illustrated in FIG. 2 and the signal representation shown in FIG. 1 relate primarily to standard NTSC signals. The invention, however, may be practiced on other signal formats such as PAL with appropriate changes in the delay elements. Apparatus for decoding PAL signals, for example, will be similar to the FIG. 2 apparatus with the following changes. Delay elements 12 and 18 may each be arranged to provide delay intervals of two horizontal line periods and delay elements 14 and 16 may each be arranged to provide delay intervals of six hundred twenty four line intervals.

What is claimed is:

1. Apparatus for separating a luminance component from composite video signal, comprising:

an input terminal for applying said composite video signal;

means coupled to said input terminal for concurrently providing replicas of said composite video signal from at least two fields of said composite video signal;

means, coupled to said means for providing, for filtering said composite video signal from one of said at least two fields to produce a low frequency luminance signal having a frequency spectrum substantially exclusive of the frequency spectrum occupied by chrominance components of said composite video signal;

means, coupled to said means for providing, for combining composite video signals from the other of said at least two fields to the exclusion of said one field to produce a high frequency luminance signal having a frequency spectrum substantially exclusive of the frequency spectrum of said low frequency luminance signal; and means for combining said low and said high frequency luminance signals to produce a wideband luminance signal.

2. The apparatus set forth in claim 1 wherein said means for providing includes a delay element, and provides said composite video signal from three succeeding video fields, said one field being disposed between two of said three succeeding fields, and provides at least one composite video signal from each of said two of said three succeeding fields which composite video signals from said two fields have an antiphase chrominance subcarrier relationship relative to each other.

3. Apparatus for decoding composite video signal comprising:

an input terminal for applying said composite video signal;

means, coupled to said input terminal, for concurrently providing replicas of said composite video signal from first, second and third succeeding fields of said composite video signal, said replicas including first and second replicas from said first field, said first and second replicas being separted by an integral number of horizontal line intervals and have an antiphase chrominance subcarrier relationship; said replicas including third and fourth replicas from said third field, said third and fourth replicas being separated by an integral number of horizontal line intervals and wherein said first and third replicas correspond to like pixels but have an antiphase chrominance subcarrier relationship, and said second and fourth replicas correspond to like pixels but have an antiphase chrominance subcarrier relationship, and said replicas including a fifth replica from said second field, said fifth replica representing pixels occurring spatio-temporally between pixels represented by said first, second, third and fourth replicas;

means coupled to said providing means, for additively combining said first, second, third and fourth replicas, to produce a high frequency luminance signal occupying a band of frequencies normally occupied by chrominance components of said composite video signal;

means coupled to said providing means, for filtering said fifth replica to produce a low frequency luminance signal occupying a band of frequencies substantially below the band of frequencies normally occupied by said chrominance components; and means, coupled to the respective means for producing said high and low frequency luminance signals, for combining said high and low frequency luminance signals to form a wide band luminance signal.

4. The apparatus set forth in claim 3 wherein the means for producing said relatively high frequency luminance signal includes:

an adder, having four input ports coupled to said providing means, for developing the sum of said first, second, third and fourth replicas at an output port thereof: and filter means, coupled to the output port of said adder, for attenuating signals having frequencies below the band of frequencies normally occupied by chrominance components of said composite video signal.

5. The apparatus set fourth in claim 3 further including:

means coupled to said providing means for combining said first and fourth replicas in a first polarity sense with said second and third replicas in the opposite polarity sense to develop a chrominance signal.

6. Apparatus for processing video signal comprising:

an input port for applying said video signal;

delay means coupled to said input port, for providing first, second, third, fourth and fifth video signals, said second, third, fourth and fifth video signals being respectively delayed relative to said first video signal by one, two hundred sixty three, five hundred twenty five and five hundred twenty six horizontal line intervals;

filter means, coupled to said delay means, for passing a relatively low frequency portion of said third video signal;

means, including combining means coupled to said delay means, for summing said first, second, fourth and fifth video signals and passing a relatively high frequency portion of the summed video signals; and means, coupled to said filter means and to the means including combining means, for combining said relatively low frequency portion of said third video signal with said relatively high frequency portion of the summed video signals.

7. The apparatus set forth in claim 6 further including means coupled to said delay means for combining said first and fifth video signals in a first polarity sense with said second and fourth video signals in the opposite polarity sense.

8. Apparatus for decoding composite video signal comprising:

an input terminal for applying said composite video signal:

means coupled to said input terminal, for concurrently providing replicas of said composite video signal from first and second fields of video signal, said replicas including first and second replicas from said first field, said first and second replicas being separated by an integral number of horizontal line intervals and have an antiphase chrominance subcarrier relationship, and said replicas including third and fourth replicas from said second field, said first and third replicas corresponding to like pixels but having an antiphase chrominance subcarrier relationships, said second and fourth replicas corresponding to like pixels but having an antiphase chrominance subcarrier relationship; and means coupled to said providing means for combining said first and third replicas in a first polarity sense with said second and fourth replicas in the opposite polarity sense to provide a chrominance signal component.

* * * * *

UNITED STATES PATENT AND TRADEMARK OFFICE
CERTIFICATE OF CORRECTION

PATENT NO. : 4,684,977

DATED : 8/4/87

INVENTOR(S) : Robert A. Dischert, et al

It is certified that error appears in the above-identified patent and that said Letters Patent is hereby corrected as shown below:

Column 3, line 24 equation equation 2 should read as follows:

$$L_{OC} = (L_A - L_D + L_E - L_B)/4.$$

Column 6, line 7 delete "relatively".

Signed and Sealed this

Twelfth Day of July, 1988

*Attest:*

DONALD J. QUIGG

*Attesting Officer*      *Commissioner of Patents and Trademarks*